(12) United States Patent
Dewald et al.

(10) Patent No.: US 6,880,935 B1
(45) Date of Patent: Apr. 19, 2005

(54) TIR PRISM ARRANGEMENT AND OPTICS FOR PROVIDING AN UNDISTORTED ILLUMINATION IMAGE

(75) Inventors: Duane Scott Dewald, Dallas, TX (US); Steven Penn, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/739,820

(22) Filed: Dec. 18, 2003

(51) Int. Cl.[7] .............................................. G03B 21/14
(52) U.S. Cl. ........................................ 353/81; 348/771
(58) Field of Search ............................. 353/31, 33, 81; 348/742, 743, 771; 349/5, 7

(56) References Cited

U.S. PATENT DOCUMENTS 5,402,184 A * 3/1995 O'Grady et al. ............ 348/764
5,420,655 A * 5/1995 Shimizu ...................... 353/33
6,588,908 B1 * 7/2003 Shimizu ...................... 353/81
6,705,734 B1 * 3/2004 Barazza ....................... 353/98

* cited by examiner

Primary Examiner—William C. Dowling
(74) Attorney, Agent, or Firm—Charles A. Brill; Wade James Brady, III; Frederick J. Telecky, Jr.

(57) ABSTRACT

A lens system for providing undistorted illumination image onto a light receiving surface such as a DMD™ (digital micromirror device) light modulator with a TIR (total internal reflection) prism arrangement by supporting the receiving face of the TIR prism arrangement at an angle with support to the principal plane of a focusing lens. The angle is used to vary the air gap between the focusing lens and the TIR prism arrangement such that the total or reflective optical path through the air gap and the TIR prism arrangement is a constant.

25 Claims, 4 Drawing Sheets

TIR PRISM ARRANGEMENT AND OPTICS FOR PROVIDING AN UNDISTORTED ILLUMINATION IMAGE

TECHNICAL FIELD

This invention relates to illumination TIR (total internal reflection) prisms and more specifically to apparatus and methods to decrease distortion of the illumination image and the consequential waste of light energy resulting from an oversized light image directed onto a receiving surface such as the mirror surface of a spatial light modulator.

BACKGROUND

Many display systems use spatial light modulators such as liquid crystal display panels (LCDs) or digital mircomirror devices (DMD™) having a large number of pixel elements (on the order of one million or more) to create images. The spatial light modulator is illuminated by a light source and the position of the pixels are controlled so that light striking selected ones of the pixel elements is reflected to a display surface or screen to generate an image.

Conventional optics include a "integrator" element or light tunnel and relay optics for forming a rectangular-shaped image used to illuminate a rectangular-shaped active area of a spatial light modulator, such as for example, a DMD™. The relay optics form an image of the "integrator" output at the modulator. However, the rectangular-shaped illuminating image used by these conventional optics arrive at the spatial light modulator at an oblique angle of about 24° to 26°. Such an oblique illumination angle results in a distorted and uneven focus of the illuminating image onto the spatial light modulator. Consequently, when using conventional optics the illuminating image is significantly oversized to assure that portions of the active area of the spatial light modulator are evenly illuminated. The oversized illumination image wastes light and often causes other problems when non-active portions of the spatial light modulator are illuminated. Therefore, it would be advantageous to adjust the shape of the illuminating image to better conform to the shape of the active area of the spatial light modulator.

SUMMARY OF THE INVENTION

These and other problems are generally solved or circumvented, and technical advantages are generally achieved, by preferred embodiments of the present invention, which provides illumination onto a light receiving surface, such as for example a spatial light modulator. A source of light is provided along an optical axis and, according to one embodiment, is transmitted through an integrator element and relay optics to form a rectangular illumination image.

A first lens is supported so that its optical angle is substantially parallel to but offset from the optical axis of the integrator lens, and is used to focus the illumination image onto a TIR (total internal reflection) prism arrangement including a reverse total internal reflection (RTIR) prism. The TIR prism arrangement is spaced from the first lens and supported such that a first or receiving face is at an angle with respect to the focal plane of the first lens. The angle of the first face of the TIR prism arrangement is selected such that the effective path length of light rays transmitted from the first lens to a receiving surface is substantially constant. The effective path length comprises the air gap between the first lens and the TIR prism arrangement, and the path through the TIR prism arrangement and the air gap to a receiving surface spaced substantially parallel to and at a selected distance from an output or exit face of the TIR prism arrangement. More specifically, light from every point on the first lens to the receiving surface satisfies the following equation. Time (T) equals distance (d) divided by the speed of light (c)

$$\left(T = \frac{d}{c}\right).$$

More specifically:

$$\frac{n_{air} d_{airgap}}{c} + \frac{n_g d_g}{c} = k$$

$n_{air}$ equals the index of refraction of air;

$d_{airgap}$ equals the varying length of the air gap between the first lens and the receiving face of the TIR prism arrangement resulting from the angle of the receiving face of the TIR prism with respect to the focal plane of the first lens;

$n_g$ equals the index of refraction of the glass used in the TIR prism arrangement;

$d_g$ equals the varying length of the glass path through the TIR prism arrangement; and k equals a constant.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
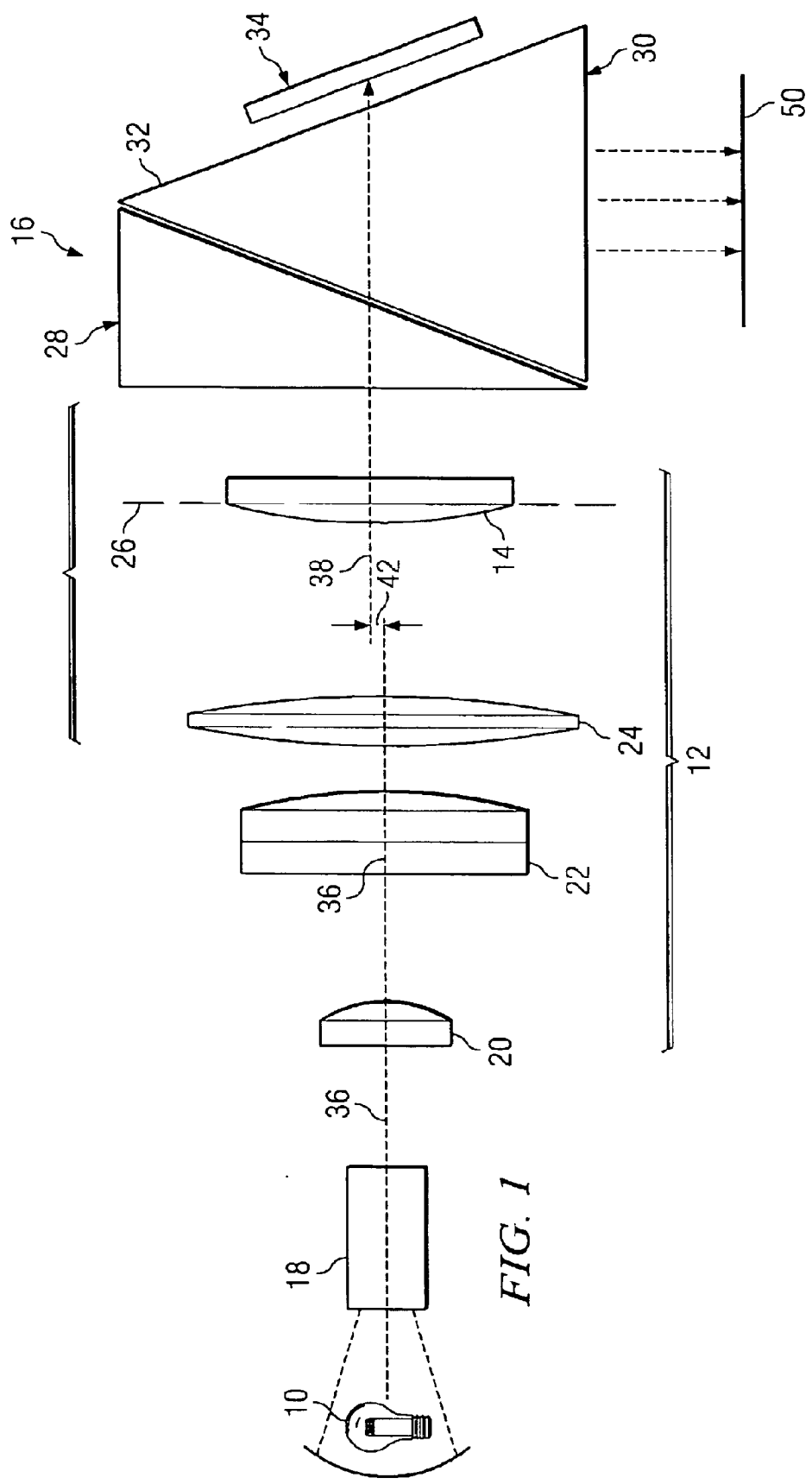
FIG. 1 illustrates a perspective view of an optical view arrangement for illuminating a light receiving surface using a dual element RTIR (reverse total internal reflection) prism arrangement.

Referring now to FIG. 1, there is illustrated an arrangement for illuminating a light receiving surface with a dual element RTIR (reverse total internal reflection) prism arrangement according to the teachings of the present invention. As shown, a light source 10 directs light through an arrangement of color correcting relay optics 12 to a first lens 14, which focuses the light onto a dual element RTIR prism arrangement. Also as shown, light from source 10 first passes through integrator element 18 such that a rectangular-shaped illumination image is formed. The rectangular-shaped illumination image generated by integrator lens 18 is received by lens 20 of the relay optics 12, which expands the image. The expanded image is received and color corrected at lens elements 22 and 24 and then transmitted to a first lens 14 having a principal plane 26. First lens 14 receives and focuses the illumination of the image onto the RTIR prism arrangement 16, which has a receiving face that is supported so that it is not parallel to focal plane 26. The RTIR prism arrangement 16 is comprised of the two prism elements 28 and 30. The illumination image exits face 32 of prism element 30 and impinges on a light receiving surface 34 that is spaced from and substantially parallel to face 32 of prism 30. The light receiving surface may be, for example, the surface of a spatial light modulator. The spatial light modulators may be an LCD (liquid crystal display) panel or a DMD™ (digital mircomirror device) such as manufactured by Texas Instruments Incorporated of Dallas, Tex.

Also as illustrated in FIG. 1, the optical axis 36 of the integrator lens 18 and elements 20, 22 and 24 of the relay optics 12 is offset by a distance of about 2.5 mm from the optical axis 38 of first lens 14 of the relay optics 12 and the prism arrangement 16 as indicated by double headed arrow 42.

Figure 2:
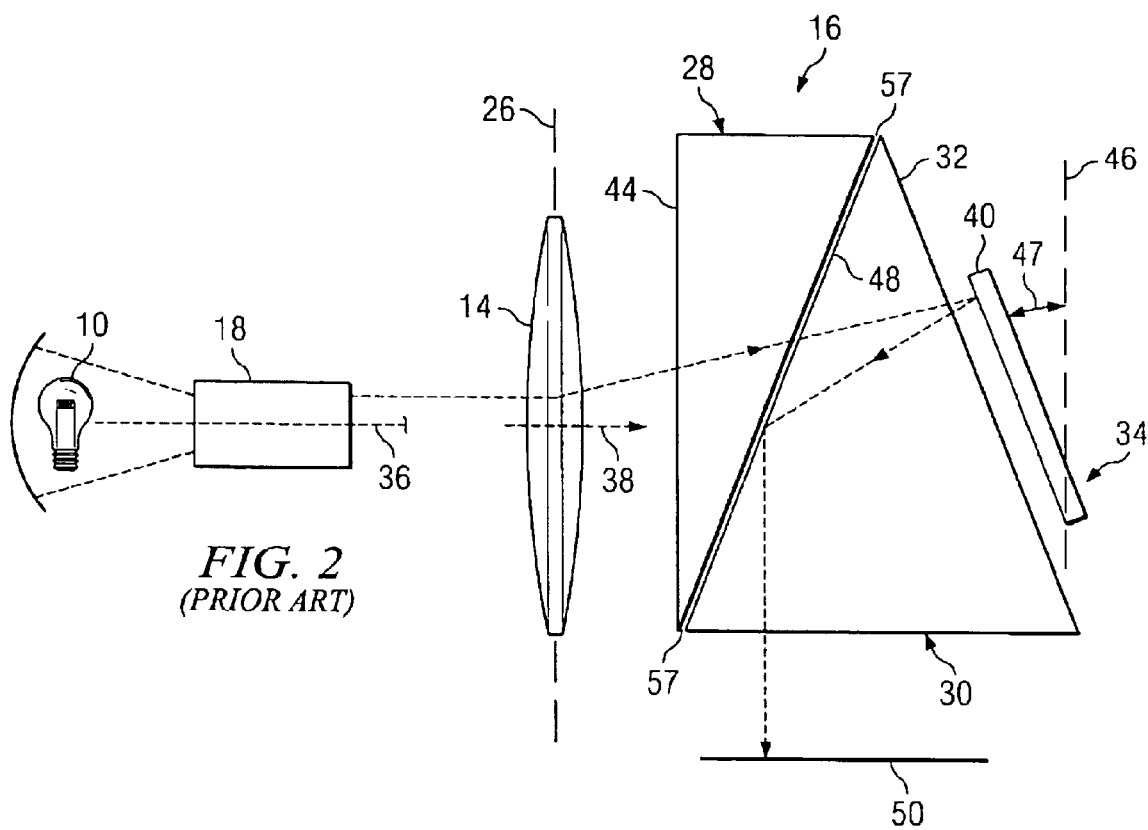
FIG. 2 is a simplified side view of a prior art RTIR prism arrangement of FIG. 1.

Referring now to FIG. 2, there is shown a simplified illustration of a prior art version of the illumination apparatus of FIG. 1 wherein the light receiving surface is the rectangular active area or mirror surface of a DMD™ spatial light modulator 40. Common elements of FIG. 2 carry the same reference numbers as corresponding elements of FIG. 1. As more clearly seen in the prior art illustration arrangement of FIG. 2, and unlike that shown in FIG. 1, the light receiving face 44 of the dual element RTIR prism arrangement 16 is supported so as to be parallel with the focal plane 26 of first lens 14. Consequently, the rectangular-shaped illumination image of the integrator lens 18 (i.e., the image plane) is tilted on the order of about twenty-six degrees with respect to the light receiving surface of the spatial light modulator 40 as indicated by the dashed line 46 representing the image plane and arcurate double headed arrow 47. As will be appreciated by those skilled in the art, it is not acceptable to support the DMD™ at an angle to surface 32 so as to lie along the image plane 46 since the light reflected from the individual mirrors of the device must re-enter prism arrangement 16 within a suitable range of angle so the light can be redirected from the surface face 48 of prism element 30 onto the display surface 50.

Figure 3:
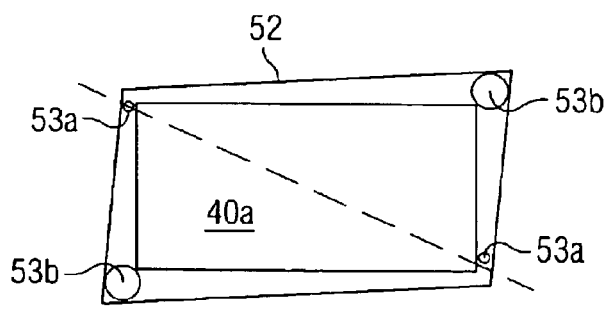
FIG. 3 illustrates the distorted illumination image generated by the prior art arrangement of FIG. 2.

Consequently, as shown in FIG. 3, the rectangular-shaped illumination image is distorted and not evenly focused on the active area 40a of the spatial light modulator 40 and, therefore, the illumination image 52 is significantly oversized, as shown, to assure that all of the corners of the active areas of the DMD™ spatial light modulator 40 (i.e., pivoting mirrors) are fully illuminated. As shown in FIG. 3, the small spots 53a represent a good focus and the large spots 53b represent a poor focus. Typical oversizing of the illumination image with the prior art arrangement is about 17%, which is of course means wasted light. The wasted light, however, not only reduces the energy efficiency of the system, but will also increase the heat load.

Figure 5:
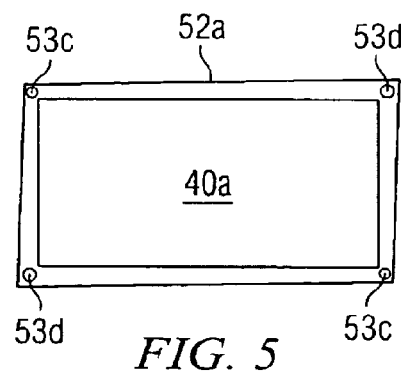
FIG. 5 illustrates the improved illumination image generated by the illumination arrangement of FIG. 4.
Figure 4:
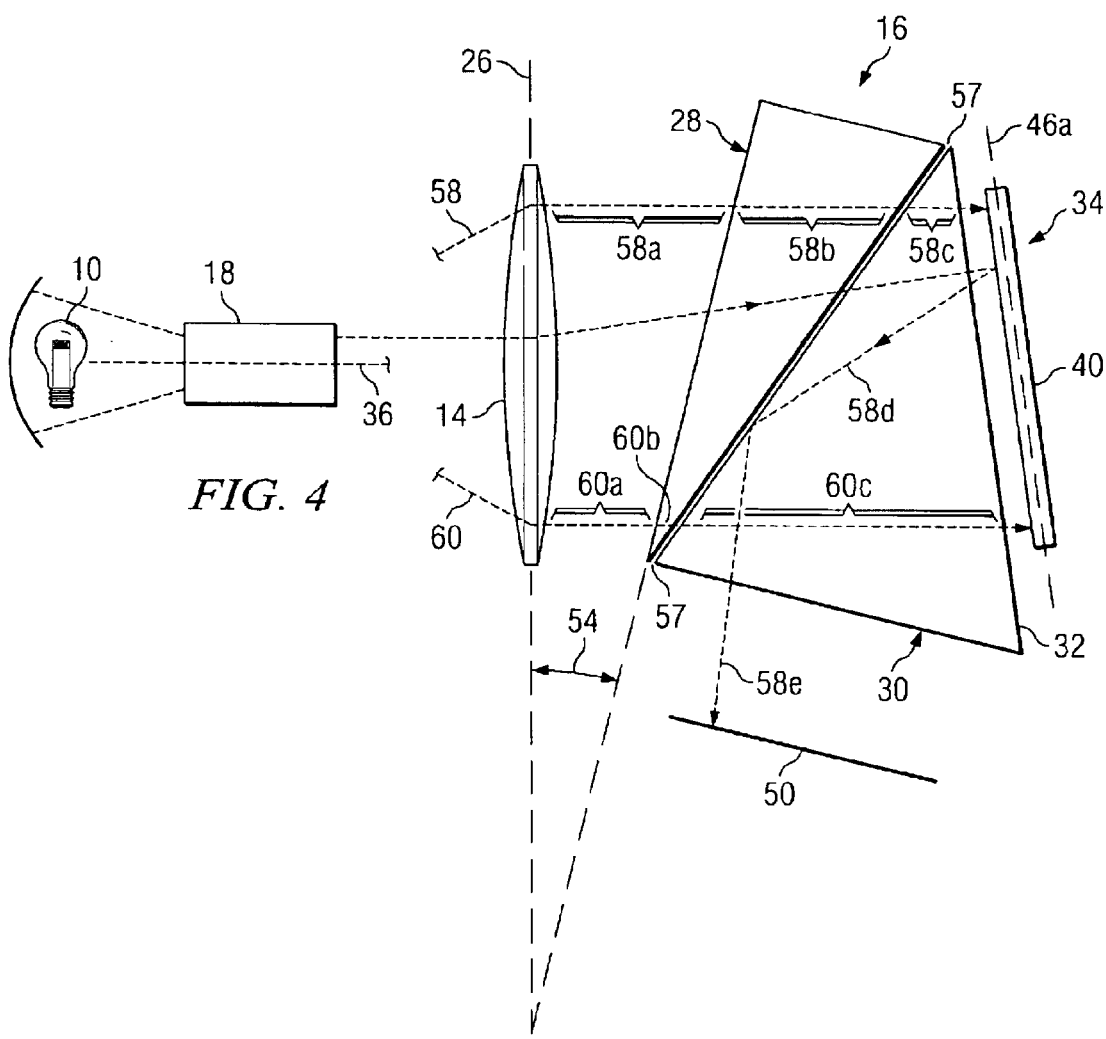
FIG. 4 illustrates an RTIR arrangement for illuminating a light receiving surface and using a dual element RTIR prism arrangement according to the present invention.

Referring now to FIGS. 4 and 5, an improved illumination arrangement according to the present invention is illustrated. As shown, all of the optical elements of the RTIR prism arrangement 16 are the same as discussed with respect to FIG. 2 except that the light receiving face 44 of prism arrangement 16 is now supported at a selected angle (as indicated by arcuate arrow 54) with respect to the principal plane 26 of first lens 14. Supporting the dual prism arrangement 16 at the selected angle 54 changes the actual physical distance of the various light paths between principal plane 26 of first lens 14 and the image plane represented by dashed line 46a so as to align the illumination image plane 46a and the receiving surface of the DMD™ spatial light modulator to be substantially co-planar. Consequently, since the image is not received at a severe oblique angle, and since the focus as illustrated by the more similar size spots 53c and 53d is improved, oversizing of the illumination image 52a with respect to the active area 40a of the spatial light modulator 40 may be significantly reduced as shown in FIG. 5. For example, depending on the alignment method, oversizing of the illumination can be reduced to between about 8% and 10% rather than 17% as was discussed above with the prior art arrangement of FIGS. 2 and 3.

The necessary angle 54 is selected so that the effective path of light from all points on the focal plane 26 of first lens 14 to the receiving surface 34 is constant. Thus, the effective optical path length is the sum of the paths through the air gap between the principal plane 26 of first lens 14 and surface 44 of prism 28 plus the path through prism element 28 and prism element 30. As will be appreciated by those skilled in the art, there is also a very small air space 57 between prism elements 28 and 30 as well as an air space between the surface 32 of prism 30 and the light receiving surface 34. However, these air spaces are constant and can be ignored when determining the selected angle 54.

The air gap between prism 28 and prism 30 can be used to compensate for coma aberrations caused by focusing the image AGA through angled glass surfaces and also caused by the displacement or offset 42 of the optical axis in FIG. 1. The air gap 57 of FIG. 5 can be adjusted in thickness to compensate for the aberrations mentioned above.

Figure 6A:
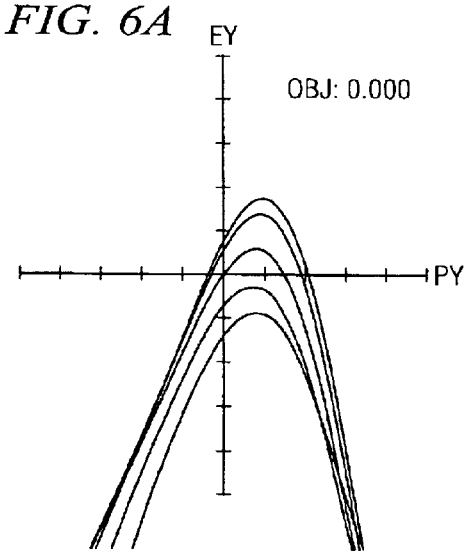
FIGS. 6A and 6B are graphs illustrating the use of axis offset and air gaps between prism elements of the RTIR arrangement of FIG. 4 to improve performance.
Figure 6B:
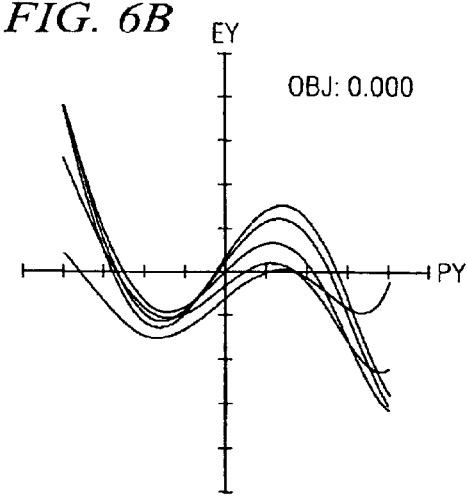

FIGS. 6A and 6B illustrate the use of air gap 57 to compensate for axis displacement. For example, FIG. 6A, a tangential ray fan, illustrates the unacceptable path of a light ray that may be exposed in an arrangement similar to FIG. 1 if the axis offset or displacement 42 is equal to zero and if there is not an air gap between prism elements 28 and 30. FIG. 6B on the other hand shows the mirror aberration exposed by a light ray of the same arrangement, except the offset or displacement 42 is about 1.5 mm and there is an air gap of about 0.5 mm between the prism elements 28 and 30. As will be appreciated by those skilled in the art, the arrangement discussed above as illustrated in FIG. 6B is an example only, and many other combinations of axis displacement and gap or spacing between prism elements are possible.

Therefore, referring again to FIG. 4, the effective or total optical path length "T" of light ray 58 at the top of first lens 14 is equal to the optical path length 58a through the air gap plus the glass optical path length 58b through prism 28 plus the glass optical path length 58c through prism 30. Similarly, the effective or total optical path length "T" of light ray 60 at the bottom of first lens 14 is equal to the sum of optical path length 60a through the shorter air gap plus the glass optical path lengths 60b and 60c through prisms 28 and 30, respectively. If the total or effective path lengths are equal, it will be appreciated that since the glass optical path of light ray 60 through prism elements 28 and 30 is greater than the glass optical path of light ray 58 through the same prism element 58 and 60, then the optical path through the air gap for ray 58 must be greater than the optical path through the air gap for ray 60 to compensate. Of course, since the index of refraction for air is different than that of glass, the total physical path length of light rays 58 and 60 cannot simply be made equal. Therefore, as will be appreciated by those skilled in the art, the effective or total optical path length for all light rays including light rays 58 and 60 may be expressed as follows:

$$\text{Equation 1: } T = \frac{n_{air}A_{air}}{c} + \frac{n_{28}G_{28}}{c} + \frac{n_{30}G_{30}}{c}$$

where

T is the effective or total optical length of a light ray;

$n_{air}$ is the index of refraction of air;

$A_{air}$ is the length of the air gap for each individual light ray;

$n_{28}$ is the index of refraction for prism 28;

$G_{28}$ is the length of the glass path through prism 28 for each light ray;

$n_{30}$ is the index of refraction of prism 30;

$G_{30}$ is the length of the glass path length through prism 30; and c is the speed of light.

Therefore, if the index of refraction of both prisms 28 and 30 is the same as is often the case, then the equation can be simplified to only two terms.

$$\text{Equation 2: } T = \frac{n_{air}A_{air}}{c} + \frac{n_g G_g}{c}$$

where $n_g$ equals the common index of refraction of the two glass prisms; and $G_g$ equals the combined path length through both prisms 28 and 30.

Therefore, if we set the air gap for one of the light rays, such as for example the bottom light ray 60 at a selected length, and since the path length through the two prisms for ray 60 can be determined or measured, the total or effective path length "T" can be calculated as a constant K.

Substituting the calculated constant K for "T", equation 2 can be rewritten as:

$$\text{Equation 3: } \frac{n_{air}A_d}{c} + \frac{n_g G_g}{c} = K$$

Since $n_{air}$, $n_g$ and c are known, it will be appreciated that $A_d$ can be calculated for different values of $G_g$ or light paths. Then, using simple algebra, the necessary angle 54 can be determined.

Figure 7:
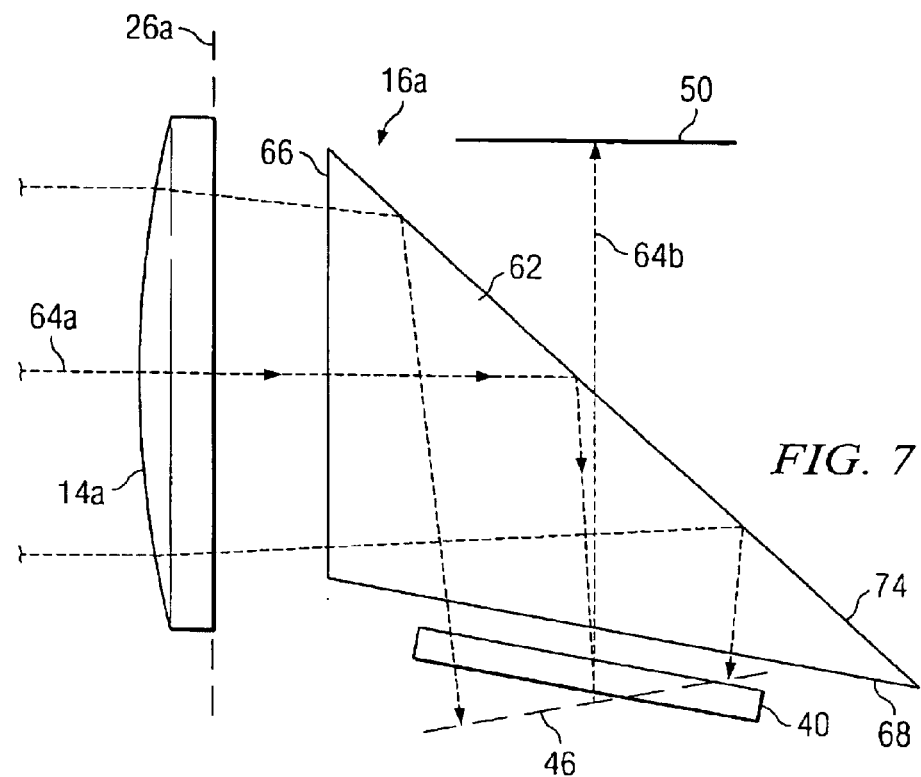
FIG. 7 illustrates another prior art illumination arrangement for illuminating a light receiving surface using a single element TIR prism arrangement.

Although the above discussion has been with respect to an RTIR dual prism arrangement 16, the same inventive principle can apply to a TIR single prism arrangement. Therefore, referring now to FIGS. 7 and 8, there is illustrated a simplified illustration of TIR prism arrangement 16a comprised of a single prism 62 (such as for example a 97°-50°-33° prism) for focusing light rays. For example, ray 64a is focused onto a DMD™ light modulator 40, which then reflects the modulated light rays such as 64b back through prism 62 onto display surface 50. FIG. 7 is a prior art arrangement having the receiving face 66 supported parallel to the focal plane 26a of first lens 14a and the reflective surface of the light modulator 40 supported parallel to surface 68 of prism 62. Consequently, the illumination image must be substantially larger than the active area of the light modulator 40 to assure that all of the mirrors are illuminated equally.

Figure 8:
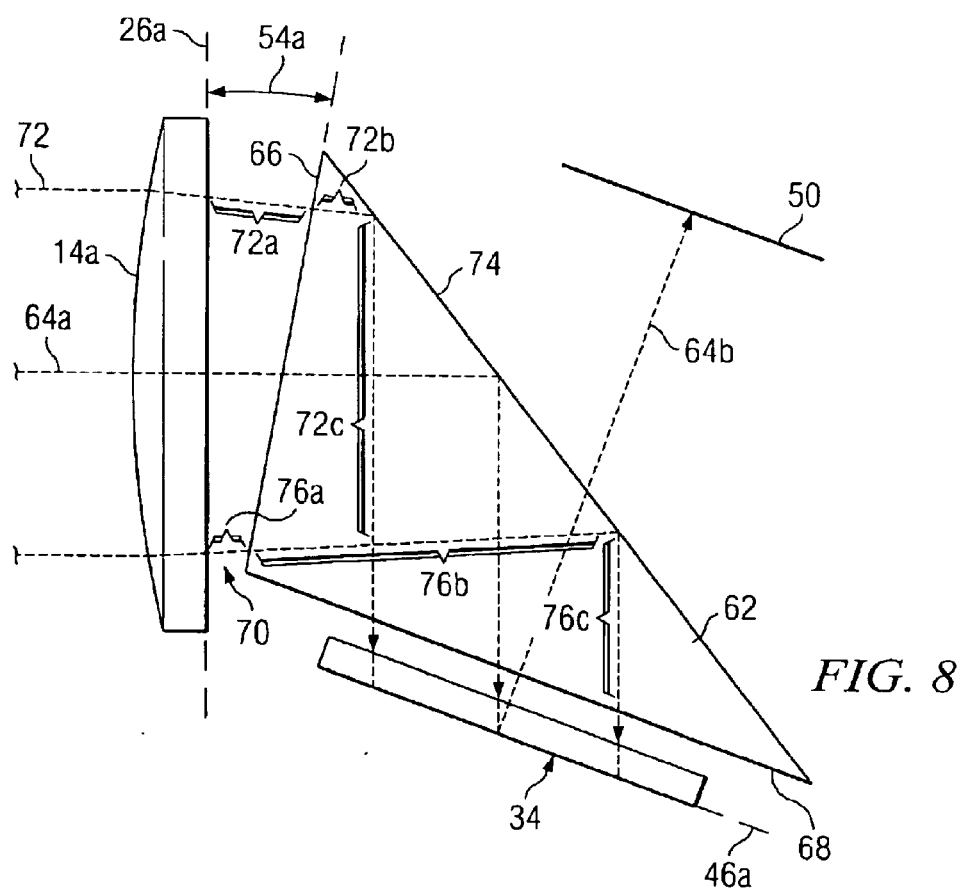
FIG. 8 illustrates another embodiment of the present invention for illuminating a light receiving surface using a single element TIR prism arrangement.

However, referring to FIG. 8, there is shown a first lens 14a, a TIR prism arrangement 16a and modulator 40 that incorporate the teachings of the present invention. As shown, the receiving face 66 of prism 62 is at a selected angle 54a with focal plane 26 so that the combined path lengths of the various light rays through the varying air gap 70 and varying glass path of prism 62 is a constant. For example, light ray 72 at the top of first lens 14a includes air gap portion 72a, a first glass portion 72b extending from receiving surface 66 to surface 74, and a second glass portion 72c from surface 74 to surface 68. Similarly, light ray 76 at the bottom of first lens 14 also includes an air gap portion 76a, a glass portion 76b and a second glass portion 72c. However, as can be seen, because receiving face 66 is at an angle (54a) with focal plane 26 of first prism 14a, air gap 76a is significantly smaller than air gap 72a to compensate for the different in the glass path length of the two light rays 72 and 76.

Angle 54a is determined in the same manner as was discussed with respect to the embodiment of FIG. 4.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus for providing illumination onto a light receiving surface;

a source of light provided along an optical axis;

a first lens having a principal plane substantially perpendicular to said optical axis for transmitting light therethrough;

a total internal reflection (TIR) prism arrangement spaced from said first lens and having a light output face and first face for receiving said transmitted light, said first face at an angle with respect to said principal plane of said first lens;

a light receiving surface substantially parallel to said light output face; and said angle of said first face selected such that the effective optical path length of said transmitted light from all points of the first lens through the air gap between the first lens and the first face of the TIR prism plus the length of the light path through the prism arrangement to every point on the light receiving surface is substantially constant.

2. The apparatus of claim 1 wherein the receiving surface is the reflective surface of a light modulator.

3. The apparatus of claim 1 wherein said optical axis of said first lens is offset from said optical axis of said integrator lens.

4. The apparatus of claim 3 wherein said offset is about between 1.5 mm and about 2.5 mm.

5. The apparatus of claim 1 wherein said TIR prism is a single element prism.

6. The apparatus of claim 5 wherein said single element prism is a 97°, 50°, 33° prism having an index of refraction "n" of between about 1.48 and about 1.65.

7. The apparatus of claim 6 wherein said index of refraction is about 1.61.

8. The apparatus of claim 7 wherein said angle of said first face to said principal plane of said first lens is about 12°.

9. The apparatus of claim 1 wherein said TIR prism system is a reverse total internal reflection (RTIR) having two prism elements.

10. The apparatus of claim 9 wherein one of said prism elements is a 90°, 45°, 45° prism and the second prism element is a 90°, X, Y prism wherein X is between about 10° and about 30° and Y equals 90°–X.

11. The apparatus of claim 10 wherein X is about 20° and Y is about 70°.

12. The apparatus of claim 9 comprising an air gap between said first prism element and said second prism element of about 0.3 mm and about 0.8 mm.

13. The apparatus of claim 12 wherein said air gap is about 0.5 mm.

14. The apparatus of claim 12 wherein said first and second prism elements are made of a material having an index of refraction of between about 1.48 and about 1.65.

15. The apparatus of claim 14 wherein said index of refraction "n" is about 1.61.

16. The apparatus of claim 10 wherein said angle of said light receiving face with respect to said plane of said first lens is about 14°.

17. The apparatus of claim 1 further comprising an integrator lens between said light source and said first lens.

18. The apparatus of claim 17 wherein said integrator lens provides an illumination image having a right angle parallelogram shape.

19. A method of providing light from a light source along an optical axis onto a light receiving surface comprising the steps of:

supporting a first lens with its principal plane perpendicular to the optical axis of said light source;

supporting the light receiving face of a total internal reflection (TIR) prism arrangement spaced from said first lens and at an angle with respect to said principal plane of said first lens;

supporting a light receiving surface spaced from and substantially parallel to an output face of said TIR prism arrangement;

transmitting light from said light source through an effective optical light path including said first lens, said space between said first lens and said TIR prism arrangement, said TIR prism arrangement, and said space between said TIR prism arrangement and said light receiving surface; and selecting the angle between said light receiving face and said focal plane of said first lens such that said effective light path for all points of said transmitted light from said first lens to the light reflecting surface is substantially constant.

20. The method of claim 18 wherein said step of supporting a light receiving surface comprises the step of supporting the reflective surface of a light modulator.

21. The method of claim 18 wherein said optical axis of said integrator lens is offset with respect to the optical axis of said first lens.

22. The method of claim 20 wherein said offset is equal to 2.5 mm.

23. The method of claim 18 wherein said step of supporting said light receiving face of a TIR prism arrangement comprises the step of supporting the light receiving face of a single element prism.

24. The method of claim 18 wherein said step of supporting said light receiving face of a TIR prism arrangement comprises the step of supporting the light receiving face of a reverse total internal reflection (RTIR) prism having two prism elements.

25. The method of claim 18 wherein said step of transmitting light comprises the steps of transmitting light from said source through an integrator element prior to being transmitted to said first lens.

* * * * *